(12) United States Patent
Ramaiyer

(10) Patent No.: US 11,593,402 B2
(45) Date of Patent: Feb. 28, 2023

(54) SYSTEM AND METHOD FOR ENABLING MULTIPLE PARENTS WITH WEIGHTS IN A MULTIDIMENSIONAL DATABASE ENVIRONMENT

(71) Applicant: ORACLE INTERNATIONAL CORPORATION, Redwood Shores, CA (US)

(72) Inventor: Kumar Ramaiyer, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 148 days.

(21) Appl. No.: 16/023,810

(22) Filed: Jun. 29, 2018

(65) Prior Publication Data

US 2019/0102445 A1    Apr. 4, 2019

Related U.S. Application Data

(60) Provisional application No. 62/565,515, filed on Sep. 29, 2017, provisional application No. 62/565,512, filed on Sep. 29, 2017.

(51) Int. Cl.
*G06F 16/00* (2019.01)
*G06F 7/00* (2006.01)
(Continued)

(52) U.S. Cl.
CPC .......... *G06F 16/283* (2019.01); *G06F 16/282* (2019.01); *G06F 16/288* (2019.01); *G06F 16/40* (2019.01)

(58) Field of Classification Search
CPC ...... G06F 16/283; G06F 16/40; G06F 16/282; G06F 16/288
(Continued)

(56) References Cited

U.S. PATENT DOCUMENTS 5,574,952 A   11/1996  Brady
5,915,129 A    6/1999  Slivka
(Continued)

FOREIGN PATENT DOCUMENTS

JP       2007531939       11/2007

OTHER PUBLICATIONS

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

(Continued)

*Primary Examiner* — Raquel Perez-Arroyo
(74) *Attorney, Agent, or Firm* — Tucker Ellis LLP

(57) ABSTRACT

In accordance with an embodiment, described herein are systems and methods for enabling multiple parents with weights in a multidimensional database. An exemplary system can comprise a computer that includes one or more microprocessors, and a multidimensional database server executing on the computer, wherein the multidimensional database server supports at least one hierarchical structure of data dimensions. A data dimension can comprises a plurality of members, a first set of members being a first level, and a second set of members being at a second level. A member of the second set of members at the second level can comprises two or more member-member relationships with two or more members of the first set of members at the first level. Each of the two or more member-member relationships are associated with a weight.

20 Claims, 13 Drawing Sheets

(51) Int. Cl.
　　*G06F 16/28*　　(2019.01)
　　*G06F 16/40*　　(2019.01)
(58) Field of Classification Search
　　USPC .......................................................... 707/600
　　See application file for complete search history.

(56) References Cited

U.S. PATENT DOCUMENTS

| | | | |
|---|---|---|---|
| 6,161,105 | A | 12/2000 | Keighan |
| 6,574,720 | B1 | 6/2003 | Hopeman |
| 6,629,102 | B1 | 9/2003 | Malloy |
| 6,766,325 | B1 | 7/2004 | Pasumansky |
| 6,873,994 | B2 | 3/2005 | Kootale |
| 7,133,876 | B2 | 11/2006 | Roussopoulos |
| 7,392,242 | B1 | 6/2008 | Baccash |
| 7,702,718 | B2 | 4/2010 | Batra |
| 7,792,784 | B2 | 9/2010 | Gupta |
| 8,156,083 | B2 | 4/2012 | Banerjee |
| 8,386,296 | B2 | 2/2013 | Hage et al. |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 2002/0029207 | A1 | 3/2002 | Bakalash |
| 2003/0005420 | A1 | 1/2003 | Ghosh |
| 2003/0093284 | A1* | 5/2003 | Kootale ............... G06Q 30/02 705/1.1 |
| 2004/0054858 | A1 | 3/2004 | Chandrasekaran |
| 2005/0071349 | A1 | 3/2005 | Jordan |
| 2005/0223021 | A1 | 10/2005 | Batra |
| 2005/0262108 | A1 | 11/2005 | Gupta |
| 2006/0010159 | A1 | 1/2006 | Mirchandani |
| 2006/0085742 | A1 | 4/2006 | Harold |
| 2006/0106769 | A1 | 5/2006 | Gibbs |
| 2006/0212672 | A1 | 9/2006 | Chandrasekaran |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0288524 | A1 | 11/2008 | Dumitru |
| 2008/0301086 | A1 | 12/2008 | Gupta |
| 2009/0018880 | A1* | 1/2009 | Bailey .................... G06Q 40/04 705/7.37 |
| 2009/0030915 | A1 | 1/2009 | Winter |
| 2009/0037499 | A1 | 2/2009 | Muthulingam |
| 2009/0248651 | A1 | 10/2009 | Perry |
| 2009/0249125 | A1 | 10/2009 | Bhatawdekar |
| 2009/0276705 | A1 | 11/2009 | Ozdemir |
| 2010/0174879 | A1 | 7/2010 | Pawar |
| 2012/0053989 | A1* | 3/2012 | Richard ................. G06Q 30/02 705/7.31 |
| 2012/0296883 | A1 | 11/2012 | Ganesh |
| 2014/0046920 | A1 | 2/2014 | Shuma |
| 2014/0052764 | A1 | 2/2014 | Michael |
| 2014/0122413 | A1 | 5/2014 | Presti |
| 2015/0186825 | A1* | 7/2015 | Balasubramhanya ...................... G06Q 10/06315 705/7.25 |
| 2015/0213154 | A1* | 7/2015 | Toebben ................. G06F 30/00 703/1 |
| 2017/0116032 | A1 | 4/2017 | Tran |
| 2017/0116215 | A1 | 4/2017 | Ramaiyer |
| 2017/0116281 | A1 | 4/2017 | Roytman |
| 2017/0116290 | A1 | 4/2017 | Reichman |
| 2017/0116308 | A1 | 4/2017 | Alberg et al. |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2017/0308315 | A1 | 10/2017 | Wang |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |

OTHER PUBLICATIONS

Russakovsky, Alexander; "Hopping over Big Data: Accelerating Ad-hoc OLAP Queries with Grasshopper Algorithms" published Feb. 26, 2015, 30 pages.

"Dynamic Flow process" definition Nov. 26, 2018, google.com, hllps://www.google.com/search?biw=1920&bih=1076&ei=njv8W_CJD4mizwK_14gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws.viz ....... Oi71 j0i7i30j0i30j0i8i30.

"Dynamic Flow process" OLAP Nov. 26, 2018, google.com, https://www.google.com/search?biw=1920&bih=1076&ei=njv8W_CJD4mizwK_14gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

ORACLE ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Dracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Notification of Transmittal of the International Search Report and the Written Opinion of the International Searching Authority for PCT Application No. PCT/US2018/044406, dated Sep. 19, 2018, 11 pages.

Driscoll, James R. et al., "Making Data Structures Persistent", Journal of Computer and System Sciences, vol. 38, No. 1, Feb. 1989, Printed in Belgium, Copyright © 1989, 39 pages.

Oracle, EPM Information Development Team, Oracle® Integrated Operational Planning, Fusion Edition Release 4.0.1 Installation Guide, Copyright © 2001, 2009, 18 pages.

Oracle, EPM Information Development Team, Oracle® Integrated Operational Planning, Fusion Edition Release 4.0.1 User's Guide, Copyright © 2004, 2009, 272 pages.

Intellectual Property India, Examination report under sections 12 & 13 of the Patents Act, 1970 and the Patents Rules, 2003 dated Jul. 20, 2021 for Indian Patent Application No. 202047013395, 7 pages.

(56) References Cited

OTHER PUBLICATIONS

Japanese Patent Office, Notice of Reasons of Refusal dated May 11, 2022 for Japanese Patent Application No. 2021-502778, 3 pages.

\* cited by examiner

SYSTEM AND METHOD FOR ENABLING MULTIPLE PARENTS WITH WEIGHTS IN A MULTIDIMENSIONAL DATABASE ENVIRONMENT

CLAIM OF PRIORITY

This application claims priority to U.S. Provisional patent application entitled "SYSTEM AND METHOD FOR ENABLING MULTIPLE PARENTS WITH WEIGHTS IN A MULTIDIMENSIONAL DATABASE ENVIRONMENT", Application No. 62/565,512, filed on Sep. 29, 2017, and to U.S. Provisional patent application entitled "SYSTEM AND METHOD FOR MODELING MULTIPLE PARENTS USING SHARED MEMBERS IN A MULTIDIMENSIONAL DATABASE ENVIRONMENT", Application No. 62/565,515, filed on Sep. 29, 2017, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for enabling multiple parents with weights in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein are systems and methods for enabling multiple parents with weights in a multidimensional database. An exemplary system can comprise a computer that includes one or more microprocessors, and a multidimensional database server executing on the computer, wherein the multidimensional database server supports at least one hierarchical structure of data dimensions. A data dimension can comprises a plurality of members, a first set of members being a first level, and a second set of members being at a second level. A member of the second set of members at the second level can comprises two or more member-member relationships with two or more members of the first set of members at the first level. Each of the two or more member-member relationships are associated with a weight.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
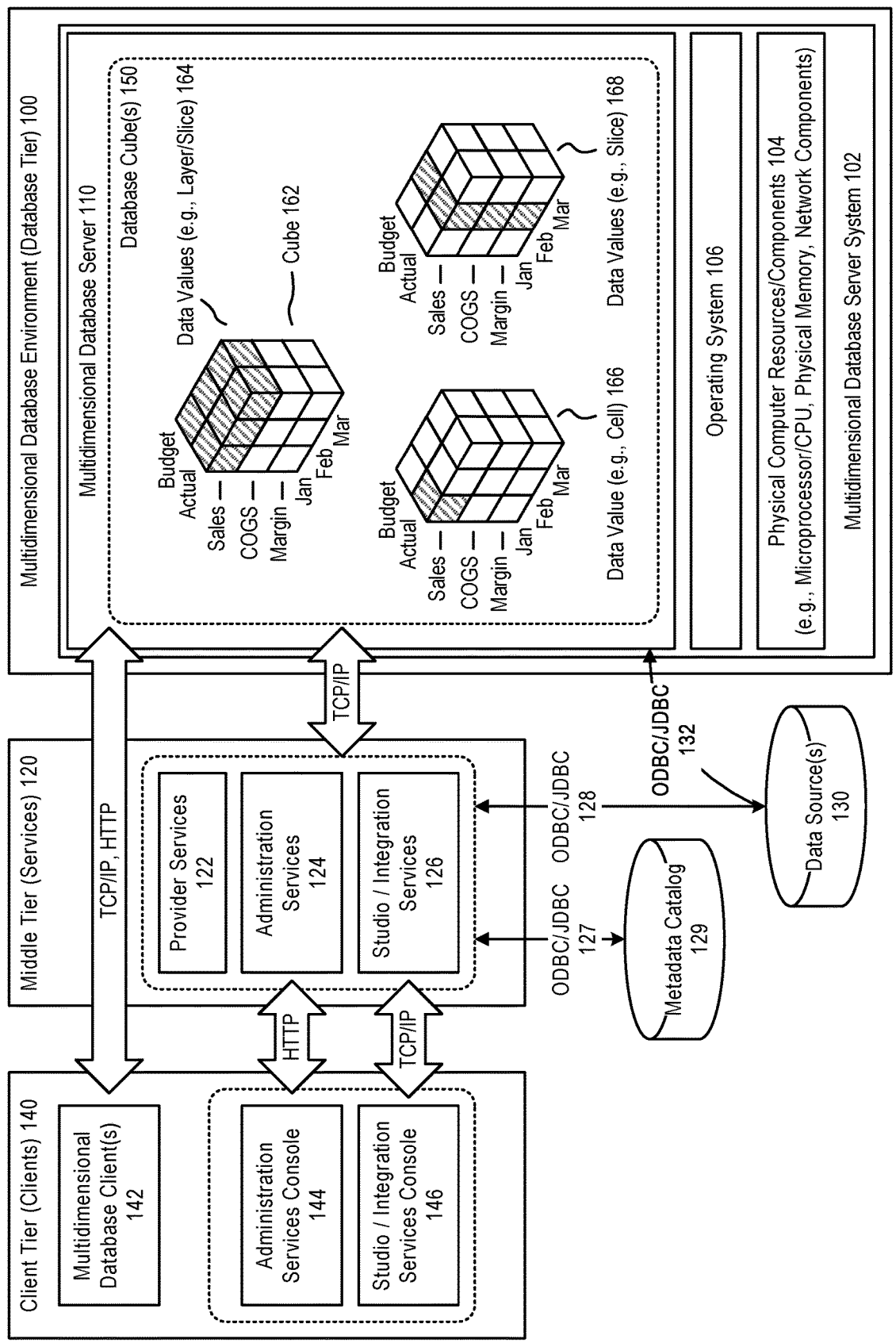
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g.; Time, Accounts, Product Line, Market; Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents; children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit"; "Inventory"; and "Ratios" may be descendants of Measures; in which case the children of "Profit", "Inventory"; and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit"; "Inventory"; and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1"; and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Enabling Multiple Parents with Weights

Figure 2:
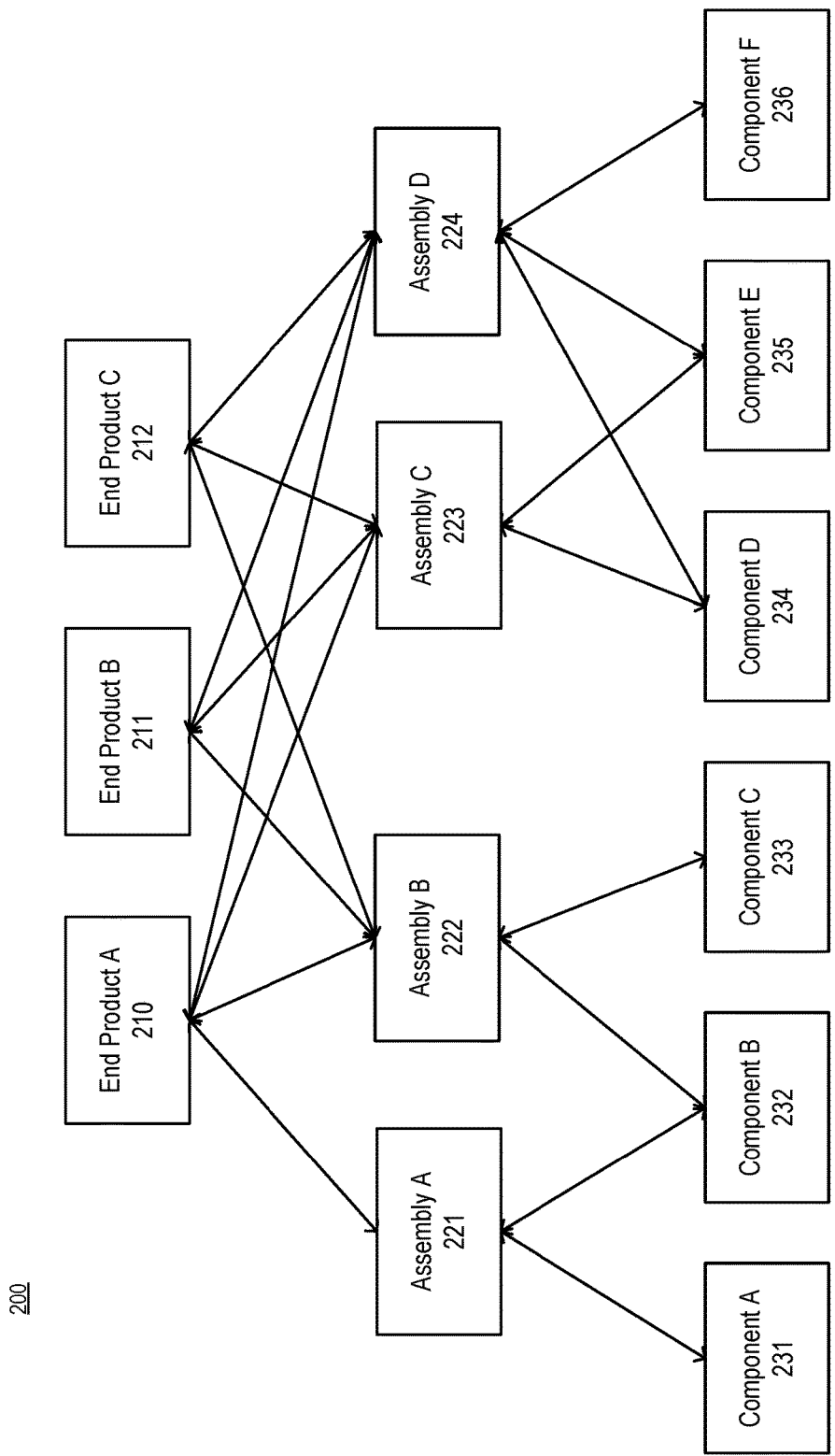
FIG. 2 shows an exemplary data structure representing a BOM, in accordance with an embodiment.

In accordance with an embodiment, a bill of materials (BOM), is a core concept in enterprise operational planning. FIG. 2 shows an exemplary data structure representing a BOM, in accordance with an embodiment.

In accordance with an embodiment, an exemplary data structure in the form of a BOM 200 is shown in FIG. 2. In the shown example, end products, such as End Product A 210, End Product B 211, and End Product C 212, can make up a top level of a BOM. Below end products there can exist a number of assemblies (or sub-assemblies), as such Assembly A 221, Assembly B 222, Assembly C 223, and Assembly D 224. These Assemblies can represent, for example, options that a client could pick for each End Product. At the bottom of the BOM are components, or a smallest part breakdown that the BOM includes. In the displayed embodiment, these components can include Components A-F 231-236.

In accordance with an embodiment, the shown BOM 200 can represent, for example, a small fraction of a larger BOM where different models of cars are the end products. That is, the End Products A-C represent different models of cars sold by a manufacturer. These cars can be sold with a number of exclusionary options (that is, if option A is selected, option B cannot be selected), For example, cars of model A can be equipped with either leather seats or fabric seats. Such options can be represented in the BOM as Assemblies, where Assembly A could represent leather seats, while Assembly B can represent fabric seats. In the displayed embodiment, taking the above as a fact set, then Model C (represented by End Product C), could only be equipped seats of Assembly B. As a further example, assume that Assembly C and Assembly D represent different types of braking systems, where Assembly C represents antilock brakes and Assembly D represents traction control breaking systems. Cars of Model A, B, and C can be optionally equipped with antilock brakes or a traction control braking system.

In accordance with an embodiment; various components can also be provided for within the data structure, wherein certain components can be associated with one or a plurality of higher level components. For example, in the BOM data structure shown FIG. 2, component B is associated with both Assembly A and Assembly B (leather seats and fabric seats). Such a component could be, for example; seat blanks (e.g., un-upholstered seats), while component A could be leather and component C could be fabric used for upholstering the seat blanks.

In accordance with an embodiment, the BOM dimension can be more genericized wherein the levels of nodes are classified from finished goods (at top), to assemblies, sub-assemblies, and components.

In accordance with an embodiment, although shown in FIG. 2 as a 3-layered data structure, such a data structure representing a BOM can involve more or fewer layers, wherein each line of materials can terminate at any level (i.e., not all leaf members at the same level).

In the above and the below examples; data dimensions of the exemplary BOMs that are discussed herein are discussed within the confines of specific examples, such as models of cars and sub-assemblies, A person of ordinary skill in the art would readily understand that the present disclosure is not limited to such specific examples, and that such examples are only provided for ease of reading. The data structures discussed herein can be used in any number of applications, with bills of material being a good example. As such, the discussion of the data structures as comprising a BOM related to the automotive industry herein should not be considered as to limit the present disclosure, but rather to provide a solid example from which general concepts can be derived.

Figure 3:
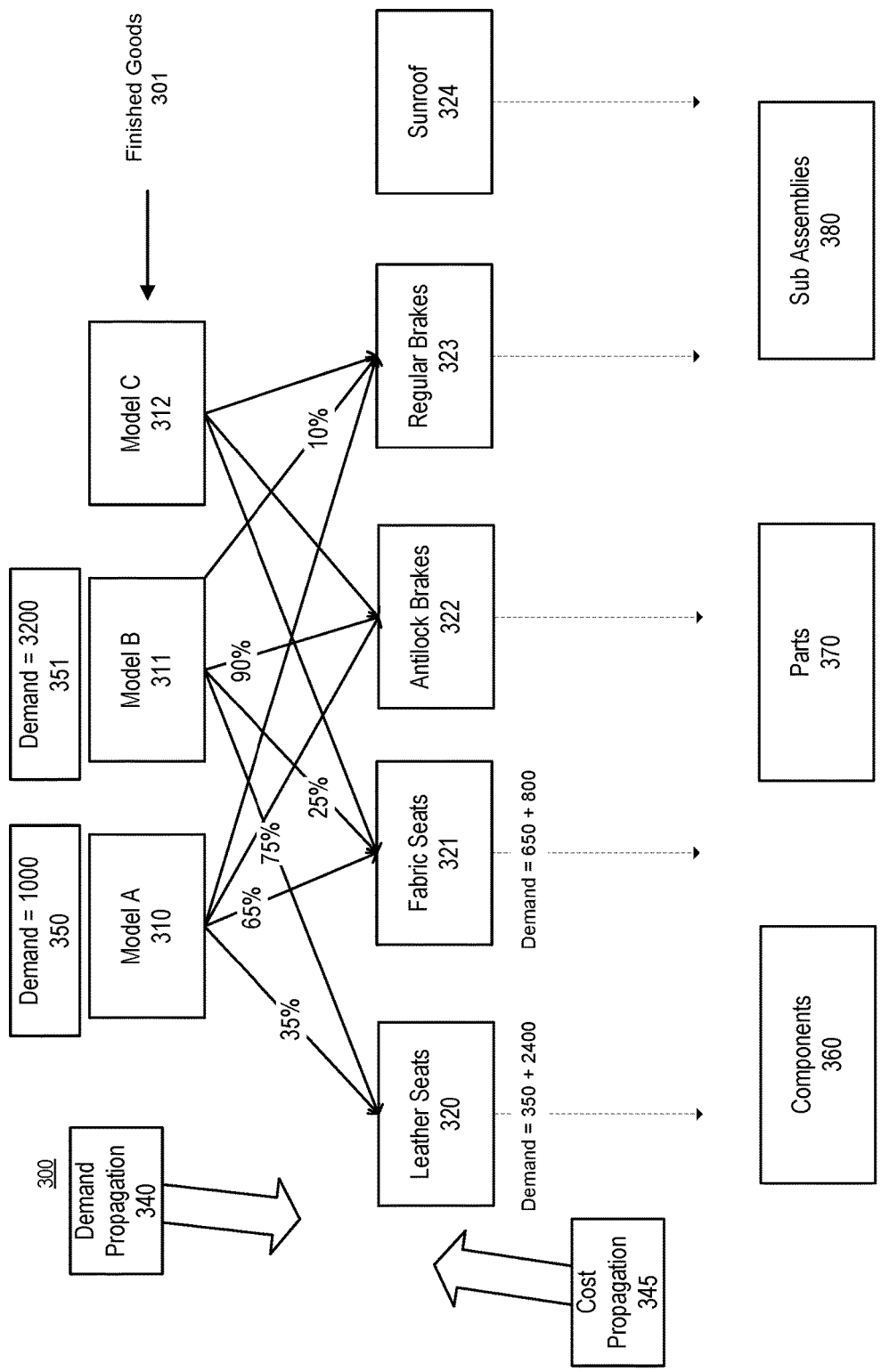
FIG. 3 shows an exemplary data structure for enabling multiple parents with weights, in accordance with an embodiment.

FIG. 3 shows an exemplary data structure for enabling multiple parents with weights, in accordance with an embodiment.

In accordance with an embodiment, an exemplary data structure in the form of a BOM 300 is shown in FIG. 3. In the shown example, finished/end products dimension 301, e.g., models of cars, are shown at the top of the data structure representing the BOM. These models include model A 310, model B 311, and model C 312. Within the BOM, the finished products can be further distinguished by a number of exclusive options represented by a number of lower level dimensions. For example, cars of model A can be equipped with either leather seats 320 or fabric seats 321, as shown. This can be true for both models B and C as well. As well, cars of model B can be equipped with either antilock brakes 322, or regular brakes 323. Cars of model A and model C likewise can be equipped with antilock brakes or a regular brakes. An additional option/dimension of a sunroof 324 can also be provided.

In accordance with an embodiment, a weight parameter can be supplied between dimensions of different levels. In the embodiment shown in FIG. 3, these weight parameters are shown as a percentage of each top dimension with regards to a lower dimension. Such weight parameters can take the form of percentages, multipliers, costs . . . etc. Such weight parameters can be stored as metadata associated with the link relationships between data dimensions of different (or sometimes the same) levels.

In accordance with an embodiment, such weight parameters can be dynamically updated. In such situations, the data structure in the form of a BOM can be updated on the fly based upon changes in the weight parameters.

In accordance with an embodiment, various components, represented by yet lower dimensions, can also be provided for within the data structure, wherein certain components can be associated with one or a plurality of higher level components. For example, in the data structure shown, components 360, parts 370, and sub-assemblies 380 can be child dimensions of the mid-level option dimensions.

In accordance with an embodiment, such a data structure representing a BOM can allow for conversion of demand for cars into first demand for options (e.g., assemblies) and then convert the demand for options into demand for parts (e.g., components or subassemblies). A demand for cars can be converted to the demand for options using option-mix percentage i.e., the percentage of people selecting an option for a car. As shown in the figure, for example, there is a demand 350 of 1,000 units for Model A 310, while there is a demand 351 of 3,200 units for Model B 311.

In accordance with an embodiment, demand for lower dimensions can additional be represented, for example, by showing the percentage demand for the various exclusion options for each higher dimension. For example, in the example shown in FIG. 3, the demands for seat options for model A can be represented as a 35% demand can be for leather seats in model A, while a 65% demand can be for fabric seats in model A. In addition, a 75% demand can be for leather seats in model B, while a 25% demand can be for fabric seats in model B. In turn, demand can be propagated downwards 340 in the data structure, meaning that 35% of 1000 vehicle demand for Model A can be translated into a demand of 350 leather seat options, and a demand of 650 fabric seat options. Likewise, demand can be propagated downwards in the data structure for model B, having a demand of 3200 units. This translates into a demand of 2400 leather seat options, and a demand of 800 fabric seat options for model B.

In accordance with an embodiment, then, the demand for options in-turn generates the demand for parts, components and sub-assemblies, etc. using similar weighted-sum techniques. Once the demand at a lower level is generated, the data structure can then be used in reverse (cost propagation in the upward direction 345) to determine "material cost" at "car" level. For that, the data structure can multiply the part demand numbers by the part-unit cost, and then propagate those values in the reverse direction. This can determine the "core material" cost. This can then compared against the car revenue to generate gross-margin numbers.

Figure 4:
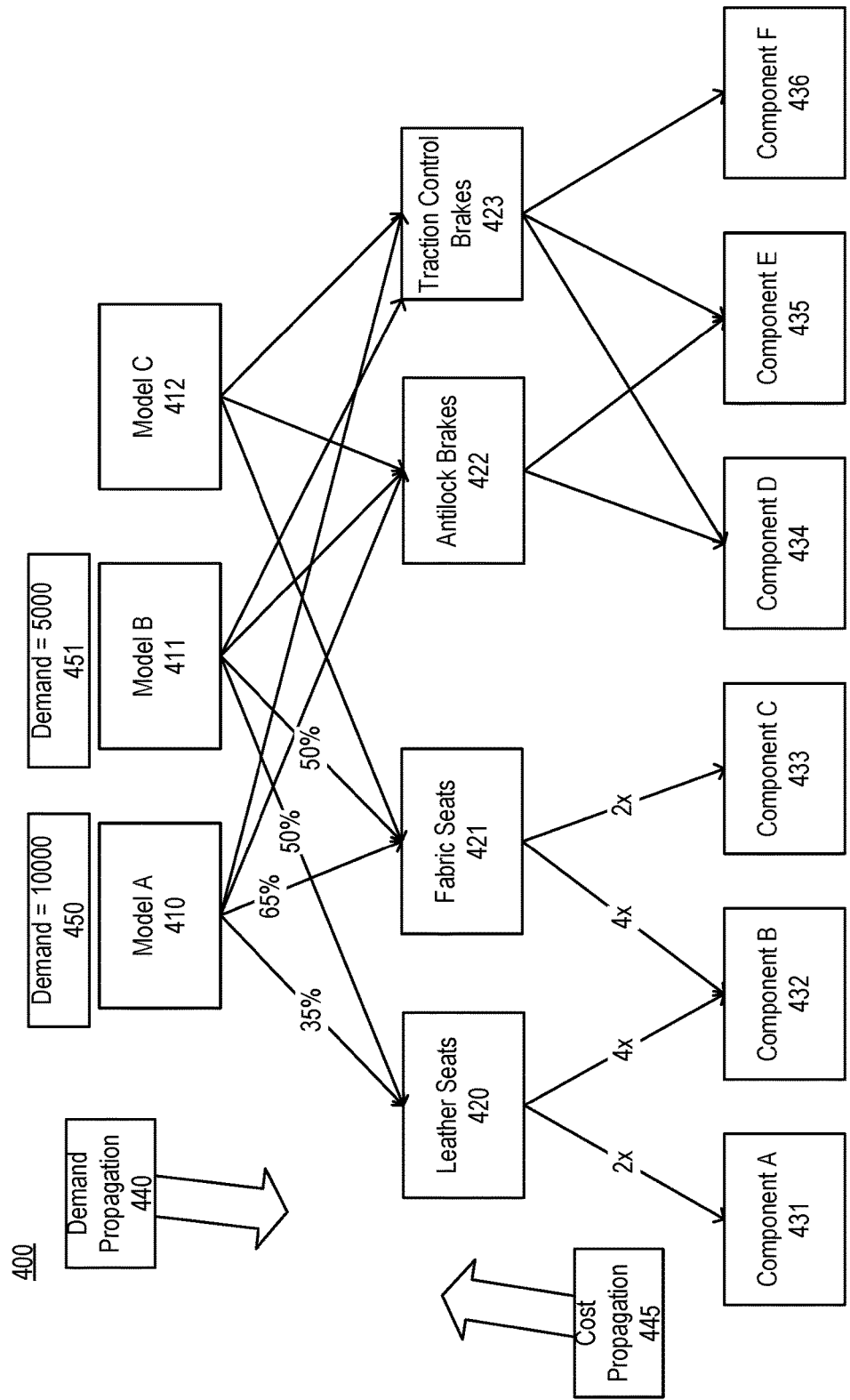
FIG. 4 shows an exemplary data structure for enabling multiple parents with weights, in accordance with an embodiment.

FIG. 4 shows an exemplary data structure for enabling multiple parents with weights, in accordance with an embodiment.

In accordance with an embodiment, an exemplary data structure in the form of a BOM 400 is shown in FIG. 4. In the shown example, end products, e.g., models of cars, are shown at the top of the data structure representing the BOM. These models include Model A 410, Model B 411, and Model C 412. These cars are generally sold with a variety of exclusionary options (that is, if option A is selected, option B cannot be selected). For example, cars of model A can be equipped with either leather seats 420 or fabric seats 421, as shown. This can be true for cars of Model B as well, while cars of Model C are limited to a fabric seat option. As well, cars of Model B can be equipped with either antilock brakes 422, or a traction control braking system 423. Cars of model A and model C likewise can be equipped with antilock brakes or a traction control braking system.

In accordance with an embodiment, the BOM can include yet another level of dimensions. This third level can comprise components, such as component A-F 431-436.

In accordance with an embodiment, a weight parameter can be supplied between dimensions of different levels. In the embodiment shown in FIG. 4, these weight parameters are shown as a percentage of each top dimension with regards to a lower dimension, as well as multipliers showing how many components are needed on a per-assembly basis. Such weight parameters can take the form of percentages, multipliers, costs . . . etc. Such weight parameters can be stored as metadata associated with the link relationships between data dimensions of different (or sometimes the same) levels.

In accordance with an embodiment, such weight parameters can be dynamically updated. In such situations, the data structure in the form of a BOM can be updated on the fly based upon changes in the weight parameters.

In accordance with an embodiment, various components can also be provided for within the data structure, wherein certain components can be associated with one or a plurality of higher level components. For example, in the data structure shown in FIG. 4, component B 432 is associated with both leather seats and fabric seats, Such a component could be, for example, seat blanks (e.g., un-upholstered seats), while component A could be leather and component C could be fabric used for upholstering the seat blanks.

In accordance with an embodiment, such a data structure representing a BOM can allow for conversion of demand for cars into first demand for options (e.g., assemblies) and then convert the demand for options into demand for parts (e.g., components or subassemblies). A demand for cars can be converted to the demand for options using option-mix percentage i.e., the percentage of people selecting an option for a car. As shown in the figure, for example, there is a demand 450 of 10,000 units for Model A, while there is a demand 451 of 5,000 units for Model B.

For example, in the embodiment shown in FIG. 4, there exists a demand 450 of 10,000 units for cars of model A, and a demand 451 of 5000 cars of model B. There can then be assigned demand for various options, such as a 35% demand leather seats in model A, while a 65% demand can be for fabric seats in model A. In addition, a 50% demand can be for leather seats in model B, while a 50% demand can be for fabric seats in model B. In turn, demand can be propagated downwards 440 (cost can be propagated upwards 445) in the data structure, meaning that 35% of 10,000 vehicles, or 3500 assemblies of leather seats must be produced for model A, while 2500 leather seat assemblies must be produced for model B. Likewise, 6500 assemblies of fabric seats must be produced for model A, while 2500 fabric seats must be produced for model B.

In accordance with an embodiment, once the demand for the options is determined, the BOM for each option can then be considered (e.g., the components needed to assemble the options).

In accordance with an embodiment, taking this downward propagation further, of the 6,000 (3500+2500) leather seat assemblies that need to be created, in total, for models A and B, 12,000 of component A (e.g., leather upholstery) for the seats must be supplied, and 24,000 of component B (e.g., seat blanks) must be supplied.

In accordance with an embodiment, then, the demand for options in-turn generates the demand for parts, components and sub-assemblies, etc. using similar weighted-sum techniques. Once the demand at a lower level is generated, the data structure can then be used in reverse (cost propagation in the upward direction) to determine "material cost" at "car" level. For that, the data structure can multiply the part demand numbers by the part-unit cost, and then propagate those values in the reverse direction. This can determine the "core material" cost. This can then compared against the car revenue to generate gross-margin numbers.

Figure 5:
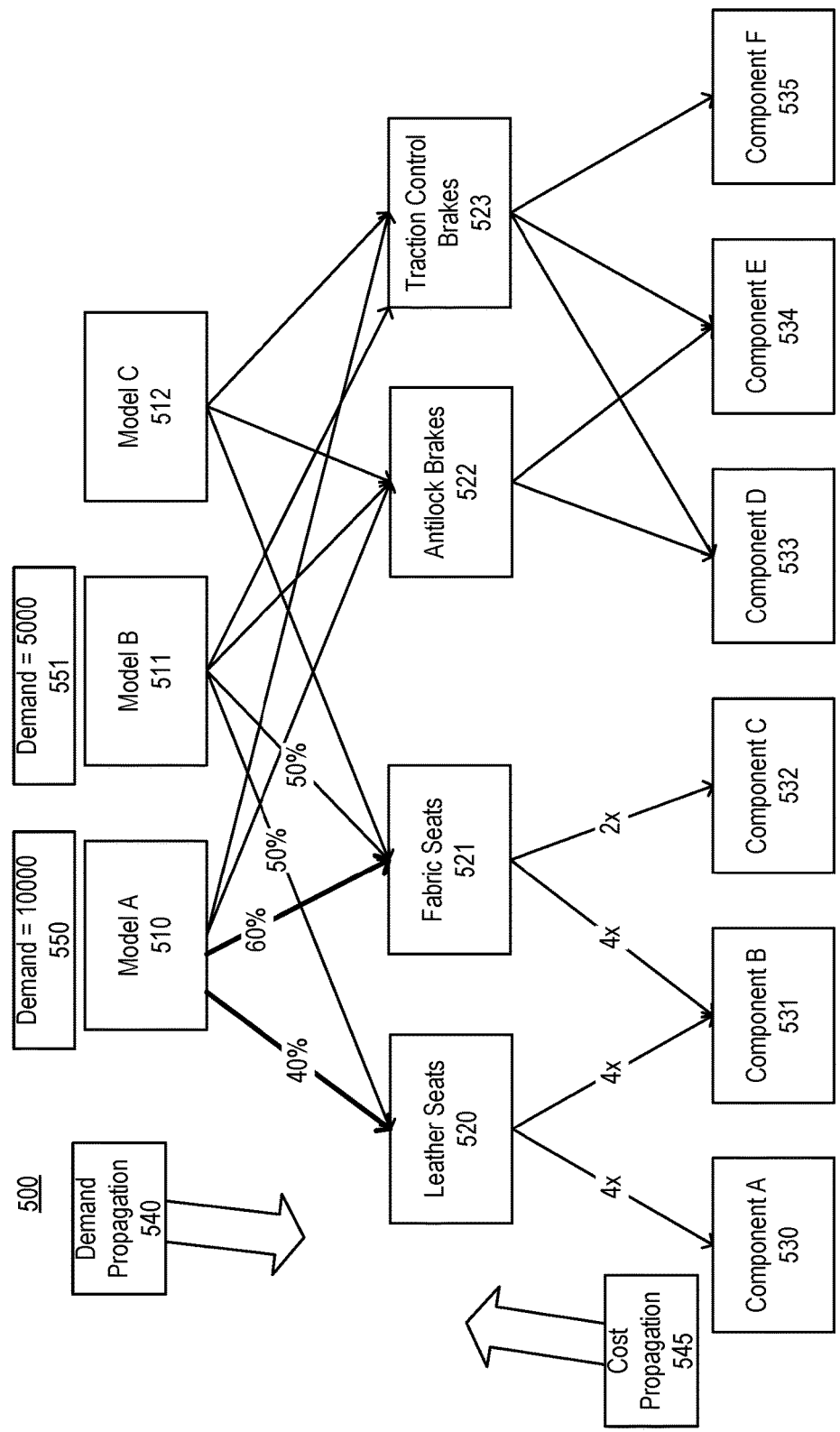
FIG. 5 shows an exemplary data structure for enabling multiple parents with weights, in accordance with an embodiment.

FIG. 5 shows an exemplary data structure for enabling multiple parents with weights, in accordance with an embodiment.

In accordance with an embodiment, an exemplary data structure in the form of a BOM 500 is shown in FIG. 5. In the shown example, end products, e.g., models of cars, are shown at the top of the data structure representing the BOM. These models include Model A 510, Model B 511, and Model C 512. These cars are generally sold with a variety of exclusionary options (that is, if option A is selected, option B cannot be selected). For example, cars of model A can be equipped with either leather seats 520 or fabric seats 521, as shown. This can be true for cars of Model B as well, while cars of Model C are limited to a fabric seat option. As well, cars of Model B can be equipped with either antilock brakes 522, or a traction control braking system 523. Cars of model A and model C likewise can be equipped with antilock brakes or a traction control braking system.

In accordance with an embodiment, the BOM can include yet another level of dimensions. This third level can comprise components, such as component A-F 530-535.

In accordance with an embodiment, as shown in the figure, for example, there is a demand 550 of 10,000 units for Model A, while there is a demand 551 of 5,000 units for Model B.

In accordance with an embodiment, a weight parameter can be supplied between dimensions of different levels. In the embodiment shown in FIG. 5, these weight parameters are shown as a percentage of each top dimension with regards to a lower dimension, as well as multipliers showing how many components are needed on a per-assembly basis. Such weight parameters can take the form of percentages, multipliers, costs . . . etc. Such weight parameters can be stored as metadata associated with the link relationships between data dimensions of different (or sometimes the same) levels.

In accordance with an embodiment, various components can also be provided for within the data structure, wherein certain components can be associated with one or a plurality of higher level components. For example, in the data structure shown in FIG. 5, component B is associated with both leather seats and fabric seats. Such a component could be, for example, seat blanks (e.g., un-upholstered seats), while component A could be leather and component C could be fabric used for upholstering the seat blanks.

In accordance with an embodiment, such a data structure representing a BOM can allow for conversion of demand for cars into first demand for options (e.g., assemblies) and then convert the demand for options into demand for parts (e.g., components or subassemblies). A demand for cars can be converted to the demand for options using option-mix percentage i.e., the percentage of people selecting an option for a car.

In accordance with an embodiment, FIG. 5 represents a change in weights from the embodiment shown in FIG. 4 associated with the relationships within the data structure. Systems and methods can allow for on-demand changing of such weighs (such as the model A vehicle with leather seats increasing to 40% demand while the demand for fabric seats decreases to 60% demand) and on the fly re-calculation of the data structure based on such changing of weights. In addition, a weight of component A to leather seats also increased to 4× from 2×.

For example, in the situation shown in FIG. 5, a newly defined 40% demand can be for leather seats in model A, while a 60% demand can be for fabric seats in model A. In addition, a 50% demand can be for leather seats in model B, while a 50% demand can be for fabric seats in model B. In turn, demand can be propagated downwards 540 (cost can be propagated upwards 545) in the data structure, meaning that 40% of 10,000 vehicles, or 4000 assemblies of leather seats must be produced for model A, while 2500 leather seat assemblies must be produced for model B.

In accordance with an embodiment, once the demand for the options is determined, the BOM for each option can then be considered (e.g., the components needed to assemble the options).

Taking this downward propagation further, of the 6,500 leather seat assemblies that need to be created, in total, for models A and B, 26,000 (i.e., the updated 4× weight) of component A (e.g., leather upholstery) for the seats must be supplied, and 26,000 of component B (e.g., seat blanks) must be supplied.

In accordance with an embodiment, then, the demand for option in-turn generates the demand for parts, components and sub-assemblies, etc, using similar weighted-sum techniques. Once the demand at a lower level is generated, the data structure can then be used in reverse (cost propagation in the upward direction 545) to determine "material cost" at "car" level. For that, the data structure can multiply the part demand numbers by the part-unit cost, and then propagate those values in the reverse direction. This can determine the "core material" cost. This can then compared against the car revenue to generate gross-margin numbers.

In accordance with an embodiment, a BOM dimension can comprise a directed acyclic graph (DAG) with weights in node relation, wherein there can be a plurality of levels of nodes. A node is a member and weight is an attribute of a member-member relation.

In accordance with an embodiment, a member can have one or a plurality parents.

In accordance with an embodiment, the data structures described above can support a weighted-sum and weighted-allocation embodiments.

In accordance with an embodiment, the BOM dimension can support dynamic creation and deletion of members. As well, the BOM dimension can support dynamic re-allocation of relationships between members of the BOM dimension. The BOM dimension can additionally support dynamic updating of weights of member-member relationships.

Figure 6:
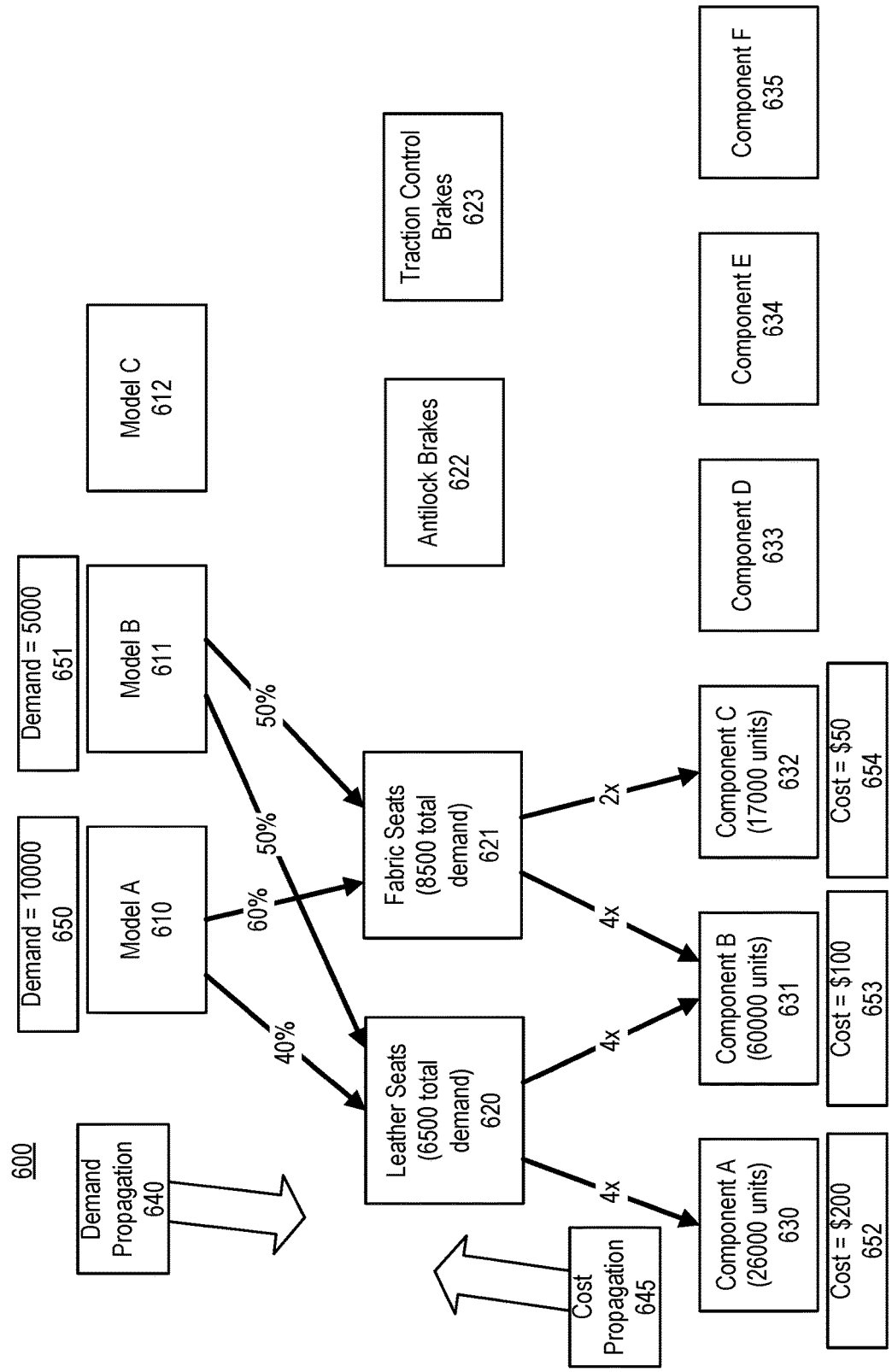
FIG. 6 shows an exemplary data structure for enabling multiple parents with weights, in accordance with an embodiment.

FIG. 6 shows an exemplary data structure for enabling multiple parents with weights, in accordance with an embodiment, More particularly, FIG. 6 highlights a downward propagation of demand for a particular option.

In accordance with an embodiment, an exemplary data structure in the form of a BOM 600 is shown in FIG. 6. In the shown example, end products, e.g., models of cars, are shown at the top of the data structure representing the BOM. These models include Model A 610, Model B 611, and Model C 612, These cars are generally sold with a variety of exclusionary options (that is, if option A is selected, option B cannot be selected). For example, cars of model A can be equipped with either leather seats 620 or fabric seats 621, as shown. This can be true for cars of Model B, Additional options, such as antilock brakes 622 and traction control brakes 623 are not relevant to the current example.

In accordance with an embodiment, the BOM can include yet another level of dimensions. This third level can comprise components, such as component A-F 630-635.

In accordance with an embodiment, as shown in the figure, for example, there is a demand 650 of 10,000 units for Model A, while there is a demand 651 of 5,000 units for Model B. As well, there are various costs 652-654 associated with components A-C.

In accordance with an embodiment, a weight parameter can be supplied between dimensions of different levels. In the embodiment shown in FIG. 6, these weight parameters are shown as a percentage of each top dimension with regards to a lower dimension, as well as multipliers showing how many components are needed on a per-assembly basis. Such weight parameters can take the form of percentages, multipliers, costs . . . etc. Such weight parameters can be stored as metadata associated with the link relationships between data dimensions of different (or sometimes the same) levels.

In accordance with an embodiment, various components can also be provided for within the data structure, wherein certain components can be associated with one or a plurality of higher level components. For example, in the data structure shown in FIG. 6, component B is associated with both leather seats and fabric seats. Such a component could be, for example, seat blanks (e.g., un-upholstered seats), while component A could be leather and component C could be fabric used for upholstering the seat blanks.

In accordance with an embodiment, such a data structure representing a BOM can allow for conversion of demand for cars into first demand for options (e.g., assemblies) and then convert the demand for options into demand for parts (e.g., components or subassemblies). A demand for cars can be converted to the demand for options using option-mix percentage i.e., the percentage of people selecting an option for a car.

For example, in the situation shown in FIG. 6, a defined 40% demand can be for leather seats in model A. In addition, a 50% demand can be for leather seats in model B. In turn, demand can be propagated downwards in the data structure, meaning that 40% of 10,000 vehicles, or 4000 assemblies of leather seats must be produced for model A, while 2500 leather seat assemblies must be produced for model B.

Following this example, with a combined 6500 cars with leather seat assemblies demand, taking the downward propagation further, 26,000 units of component A (e.g., leather upholstery) for the seats must be supplied, and 26,000 units of component B (e.g., seat blanks) are calculated to be supplied for the leather seat option.

In accordance with an embodiment, and continuing with the example, in the situation shown in FIG. 6, a defined 60% demand can be for fabric seats in model A. In addition, a 50% demand can be for leather seats in model B. In turn, demand can be propagated downwards in the data structure, meaning that 60% of 10,000 vehicles, or 6000 assemblies of leather seats must be produced for model A, while 2500 leather seat assemblies must be produced for model B.

Following this example, with a combined 8500 cars with leather seat assemblies demand, taking the downward propagation further, 17,000 units of component C (e.g., fabric upholstery) for the seats must be supplied, and 34,000 units of component B (e.g., seat blanks) are calculated to be supplied for the fabric seat option.

Figure 7:
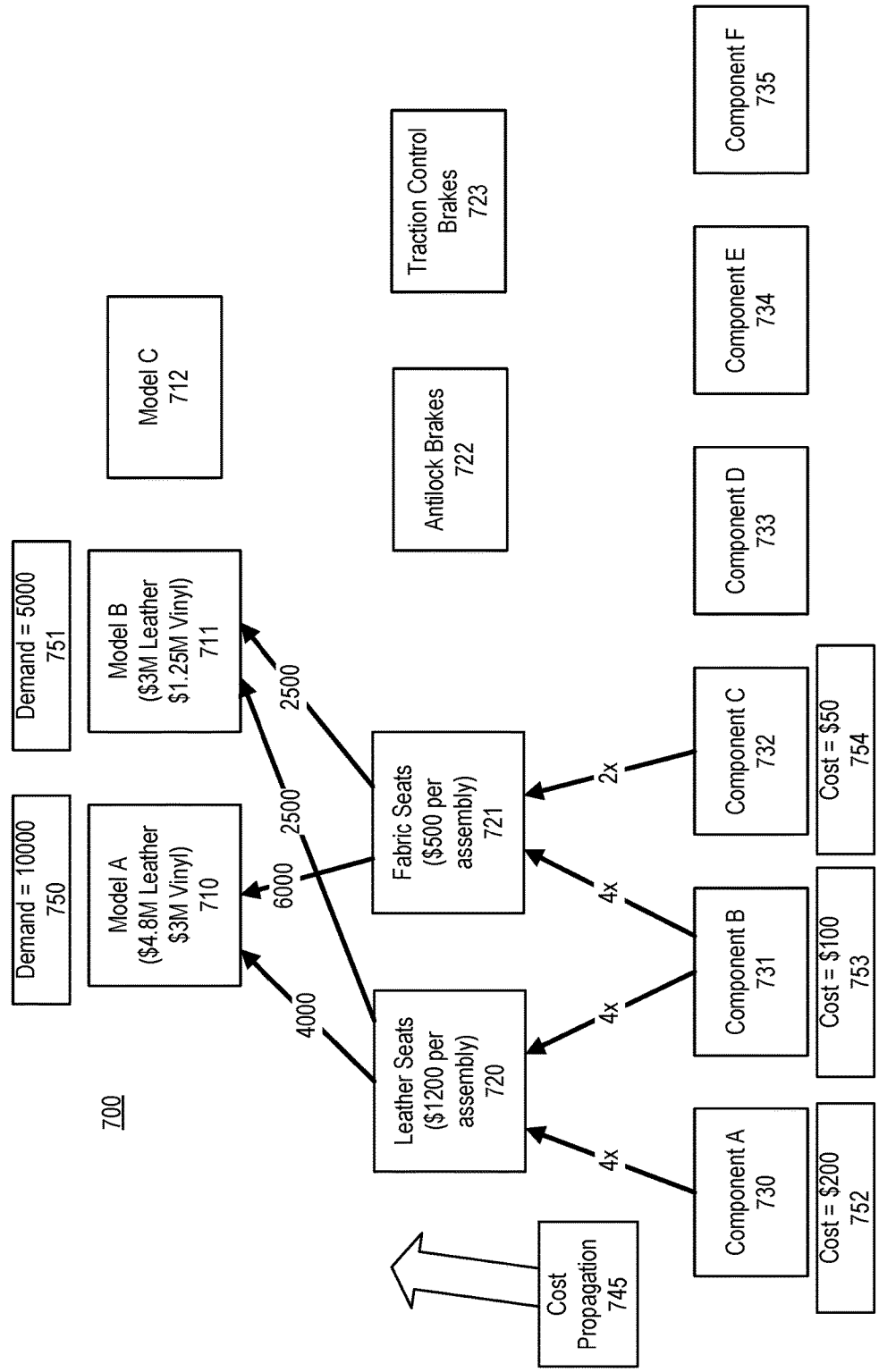
FIG. 7 shows an exemplary data structure for enabling multiple parents with weights, in accordance with an embodiment.

FIG. 7 shows an exemplary data structure for enabling multiple parents with weights, in accordance with an embodiment. More particularly, FIG. 7 highlights an upward propagation of cost for a particular option.

In accordance with an embodiment, an exemplary data structure in the form of a BOM 700 is shown in FIG. 7. In the shown example, end products, e.g., models of cars, are shown at the top of the data structure representing the BOM. These models include Model A 710, Model B 711, and Model C 712. These cars are generally sold with a variety of exclusionary options (that is, if option A is selected, option B cannot be selected). For example, cars of model A can be equipped with either leather seats 720 or fabric seats 721, as shown. This can be true for cars of Model B. Additional options, such as antilock brakes 722 and traction control brakes 723 are not relevant to the current example.

In accordance with an embodiment, the BOM can include yet another level of dimensions. This third level can comprise components, such as component A-F 730-735.

In accordance with an embodiment, as shown in the figure, for example, there is a demand 750 of 10,000 units for Model A, while there is a demand 751 of 5,000 units for Model B. As well, there are various costs 752-754 associated with components A-C.

In accordance with an embodiment, various components can also be provided for within the data structure, wherein certain components can be associated with one or a plurality of higher level components. For example, in the data structure shown FIG. 7, component B is associated with both leather seats and fabric seats. Such a component could be, for example, seat blanks (e.g., un-upholstered seats), while component A could be leather and component C could be fabric used for upholstering the seat blanks.

In accordance with an embodiment, such a data structure representing a BOM can allow for conversion of demand for cars into first demand for options (e.g., assemblies) and then convert the demand for options into demand for parts (e.g., components or subassemblies). A demand for cars can be converted to the demand for options using option-mix percentage i.e., the percentage of people selecting an option for a car. After figuring out the demand for each sub component or sub assembly (see, e.g., FIG. 6), the cost per unit of sub component or sub assembly can be propagated back up.

For example, in the situation shown in FIG. 7, the cost per component of subcomponent A is $200, the cost per component of subcomponent B is $100, and the cost per component of subcomponent A is $50. The cost per leather seat assembly is then $1200, and the cost per fabric seat assembly is $500. Taking the demand for each model (shown in FIG. 7), and multiplying by the cost per leather and fabric seat assembly, model A will have a cost of $4.8M for leather seat assemblies and a cost of $3M for fabric seat assemblies, while model B will have a cost of $3M for leather seat assemblies, and a cost of $1.25M for fabric seat assemblies.

Figure 8:
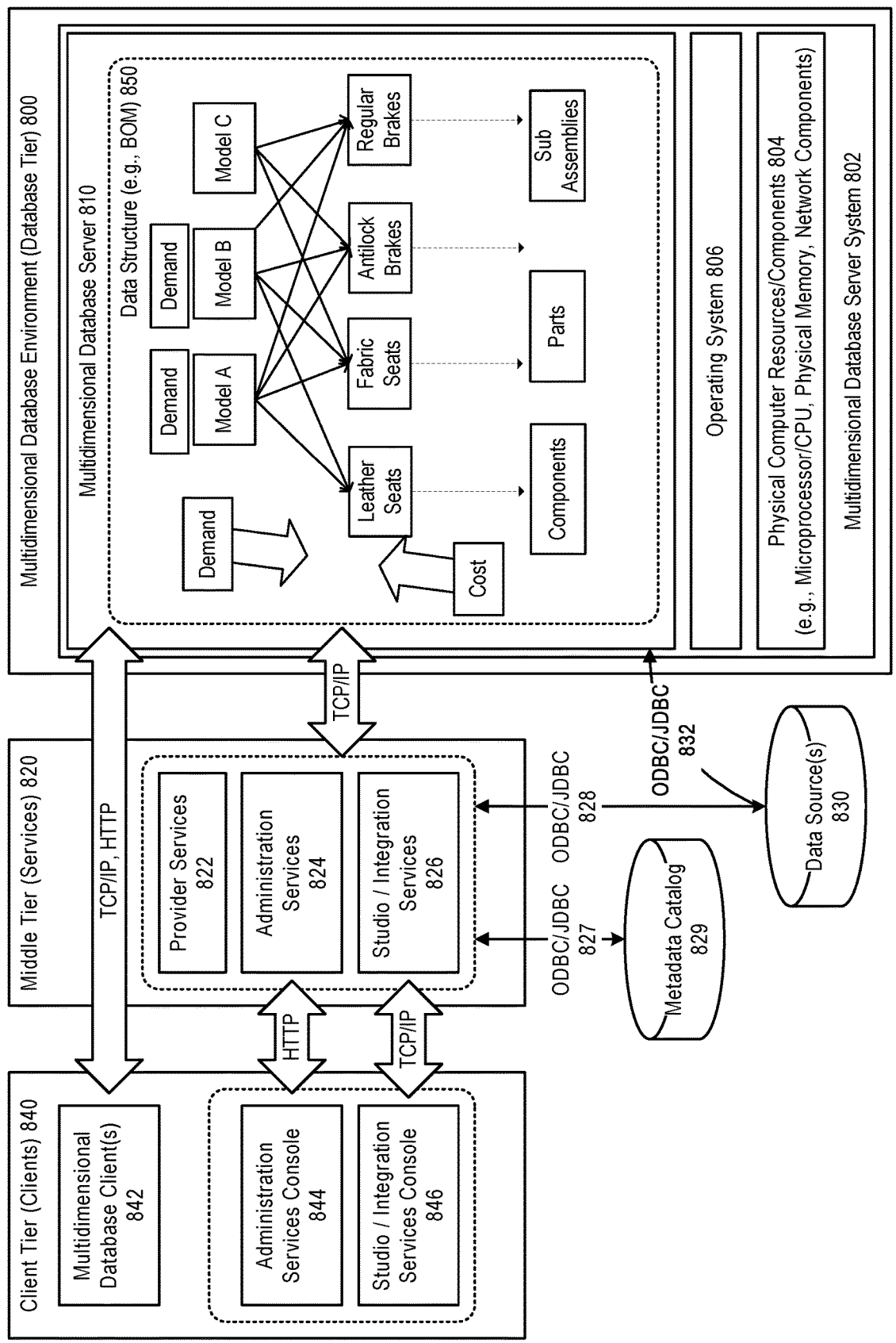
FIG. 8 shows an exemplary data structure for enabling multiple parents with weights, in accordance with an embodiment.

FIG. 8 shows an exemplary data structure for enabling multiple parents with weights, in accordance with an embodiment.

As illustrated in FIG. 8, in accordance with an embodiment, a multidimensional database environment, operating as a database tier, can include one or more multidimensional database server system(s) 802, each of which can include physical computer resources or components 804 (e.g., microprocessor/CPU, physical memory, network components), an operating system 806, and one or more multidimensional database server(s) 810 (e.g., Essbase Servers).

In accordance with an embodiment, a middle tier 820 can include one or more service(s), such as, for example, provider services 822, administration services 824, or studio/integration services 826. The middle tier can provide access, via ODBC/JDBC 827, 828, or other types of interfaces, to a metadata catalog 829, and/or one or more data source(s) 830 (for example, a relational database), for use with the multidimensional database environment.

In accordance with an embodiment, the one or more data source(s) can also be accessed, via ODBC/JDBC 832, or other types of interfaces, by the one or more multidimensional database server(s), for use in providing a multidimensional database.

In accordance with an embodiment, a client tier 840 can include one or more multidimensional database client(s) 842, that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 844, or a studio/integration services console 846.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, or data structure 850, which can then be accessed to provide filtered information to end-users. In accordance with an embodiment, the data structure can comprise a multi-level data structure, with certain data dimensions having multiple parents, weight weights supplied as metadata between the different dimensions. Such a data structure, for example, can be in the form of a bill of materials.

Figure 9:
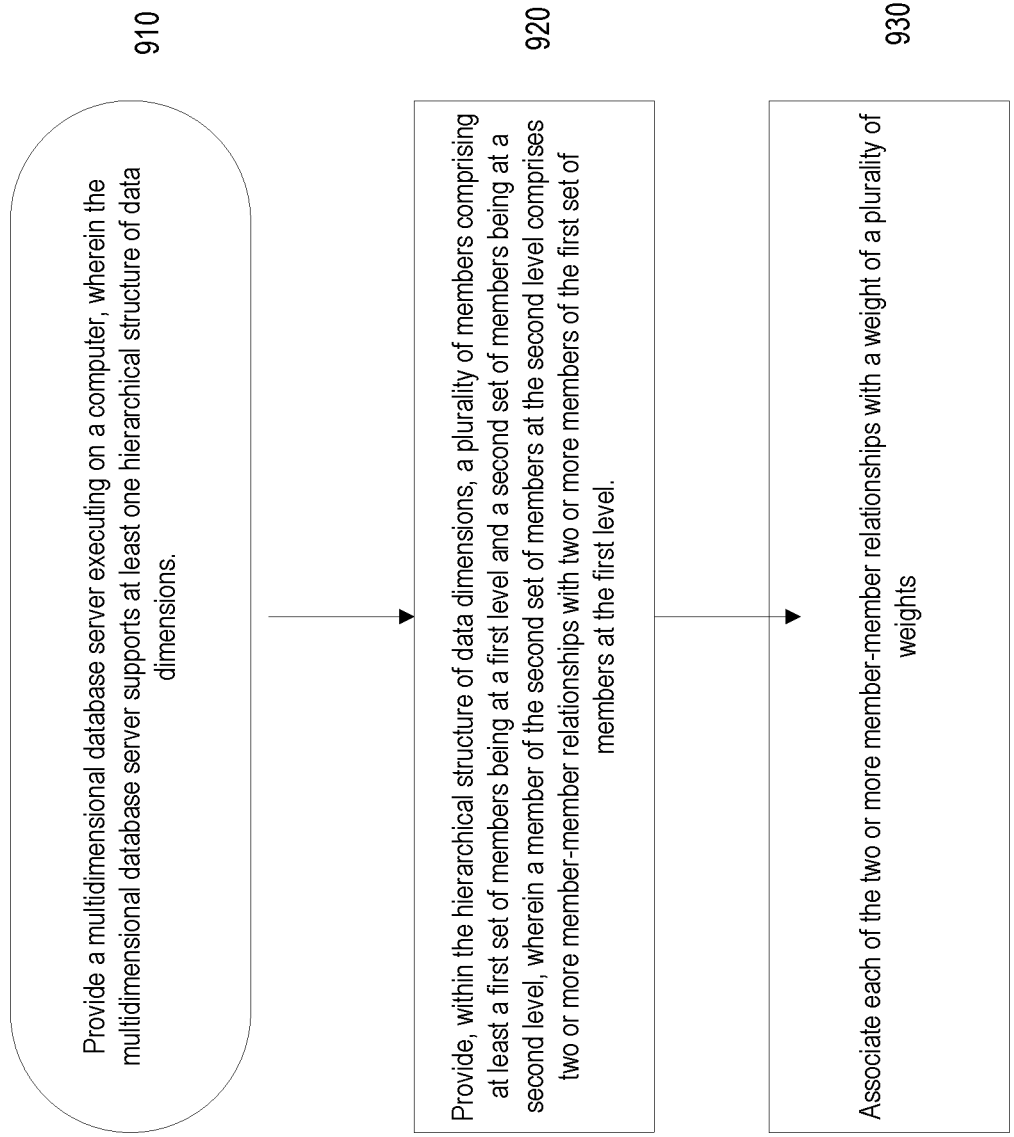
FIG. 9 is a flowchart of a method for enabling multiple parents with weights, in accordance with an embodiment.

FIG. 9 is a flowchart for a method for enabling multiple parents with weights in a multidimensional database, in accordance with an embodiment.

At step 910, the method can provide a multidimensional database server executing on a computer, wherein the multidimensional database server supports at least one hierarchical structure of data dimensions.

At step 920, the method can provide, within the hierarchical structure of data dimensions, a plurality of members comprising at least a first set of members being at a first level and a second set of members being at a second level, wherein a member of the second set of members at the second level comprises two or more member-member relationships with two or more members of the first set of members at the first level.

At step 930, the method can associate each of the two or more member-member relationships with a weight of a plurality of weights.

Multiple Parents Using Shared Members

Figure 10:
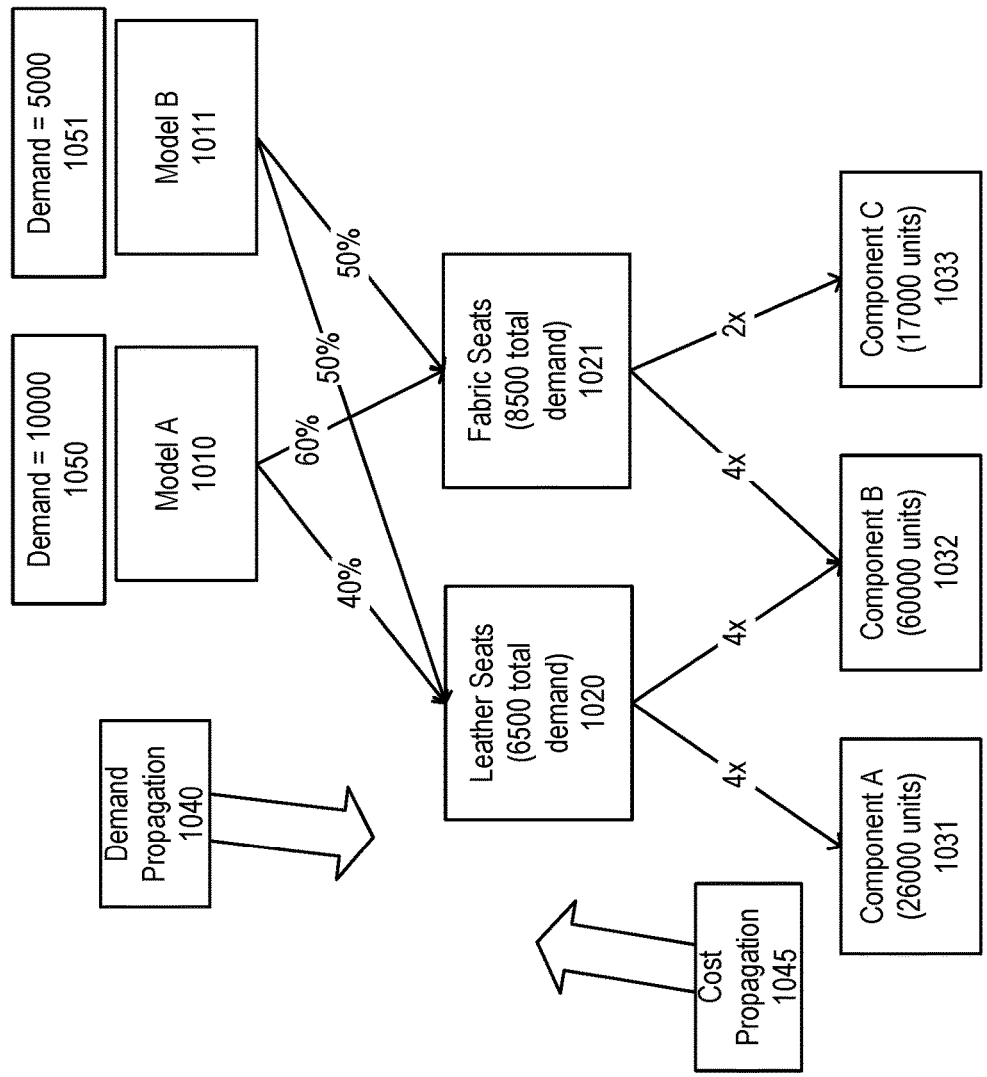
FIG. 10 shows an exemplary data structure for modeling multiple parents using shared members, in accordance with an embodiment.

FIG. 10 shows an exemplary data structure for modeling multiple parents using shared members, in accordance with an embodiment. More particularly, FIG. 10 highlights a downward propagation of demand for a particular option.

In accordance with an embodiment, an exemplary data structure in the form of a BOM is shown in FIG. 10. In the shown example, end products, e.g., models of cars, are shown at the top of the data structure representing the BOM. These models include model A 1010 and model B 1011. These cars are generally sold with a variety of options (some of which can be exclusionary). For example, cars of model A can be equipped with either leather seats 1020 or fabric seats 1021, as shown. This can be true for cars of model B as well.

In accordance with an embodiment, various components can also be provided for within the data structure, wherein certain components can be associated with one or a plurality of higher level components. For example, in the data structure shown in FIG. 10, component B is associated with both leather seats and fabric seats. Such a component could be, for example, seat blanks (e.g., un-upholstered seats), while component A could be leather and component C could be fabric used for upholstering the seat blanks.

In accordance with an embodiment, such a data structure representing a BOM can allow for conversion of demand for cars, 1050 and 1051, into first demand for options (e.g., assemblies) and then convert the demand 1040 for options into demand for parts (e.g., components or subassemblies). A demand for cars can be converted to the demand for options using option-mix percentage i.e., the percentage of people selecting an option for a car.

In accordance with an embodiment, systems and methods can allow for on-demand changing of such weighs (e.g., if model A has weights changed from 35% to 40% on leather seats, and from 65% to 60% on fabric seats), and on the fly re-calculation of the data structure based on such changing of weights.

In accordance with an embodiment, once the demand for the options is determined, the BOM for each option can then be considered (e.g., the components needed to assemble the options).

Taking this downward propagation further, of the 6,500 leather seat assemblies that need to be created, in total, for models A and B, 26,000 (i.e., the updated 4× weight) of component A 1031 (e.g., leather upholstery) for the seats must be supplied, 26,000 of component B 1032 (e.g., seat blanks), and 1700 units of component C are calculated.

In accordance with an embodiment, then, the demand for options in-turn generates the demand for parts, components and sub-assemblies, etc. using similar weighted-sum techniques. Once the demand at a lower level is generated, the data structure can then be used in reverse (cost propagation 1045 in the upward direction) to determine "material cost" at "car" level. For that, the data structure can multiply the part demand numbers by the part-unit cost, and then propagate those values in the reverse direction. This can determine the "core material" cost. This can then compared against the car revenue to generate gross-margin numbers.

In accordance with an embodiment, a BOM dimension can comprise a directed acyclic graph (DAG) with weights being associated node relationships as metadata, wherein there can be a plurality of levels of nodes. A node is a member and weight is an attribute of a member-member relation.

In accordance with an embodiment, the data structures described above can support a weighted-sum and weighted-allocation embodiments.

In accordance with an embodiment, the data structure shown in FIG. 10 can support dynamic creation and deletion of members. As well, the BOM dimension can support dynamic re-allocation of relationships between members of the BOM dimension. The BOM dimension can additionally support dynamic updating of weights of member-member relationships.

Figure 11:
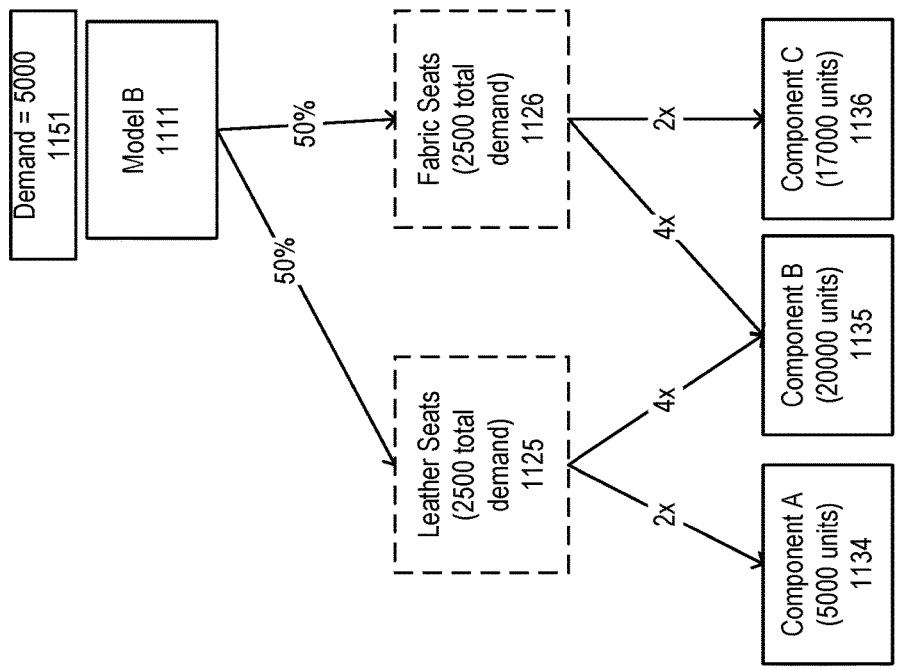
FIG. 11 shows an exemplary data structure for enabling multiple parents using shared members, in accordance with an embodiment.
Figure 11:
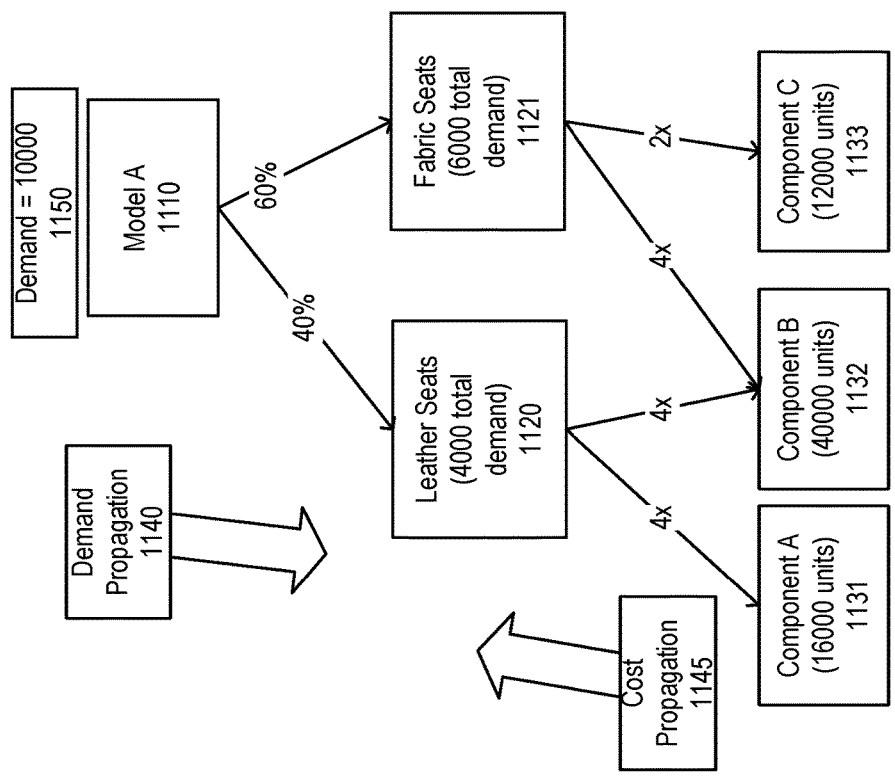

FIG. 11 shows an exemplary data structure for enabling multiple parents using shared members, in accordance with an embodiment.

In accordance with an embodiment, an exemplary data structure in the form of a BOM is shown in FIG. 11. In the shown example, end products, e.g., models of cars (i.e., model A and B 1110 and 1111), are shown at the top of the data structure representing the BOM. These models include model A, and model B. As well, as seen in FIG. 10, certain dimensions of lower levels than the root level can comprise multiple parents. That is, both the leather seat option and the fabric seat option support multiple parents.

In accordance with an embodiment, in order to simplify calculations and support dynamic recalculation, dimensions having multiple parents can be copied/replicated such that each dimension supports only one parent.

In accordance with an embodiment, at the mid-level of the data structure, both the "leather seats" 1120 and "fabric seats" 1121 dimensions have multiple parents. These data dimensions are then duplicated such that there exists only a single parent relationship. The duplicated data dimensions 1125 and 1126 can then be considered as a separate data structure.

This is shown in FIG. 11 where both the leather seat option and the fabric seat option have been copied (shown by dashed lines) such that each dimension in the middle level only supports one parent. Downward propagation of demand in such circumstances is automatically calculated/updated accordingly.

In accordance with an embodiment, note that demand propagation 1140 is carried over and the component dimensions are then recalculated in 1131-1136. Likewise, though not shown, the cost propagation 1145 can be recalculated to (automatically).

Figure 12:
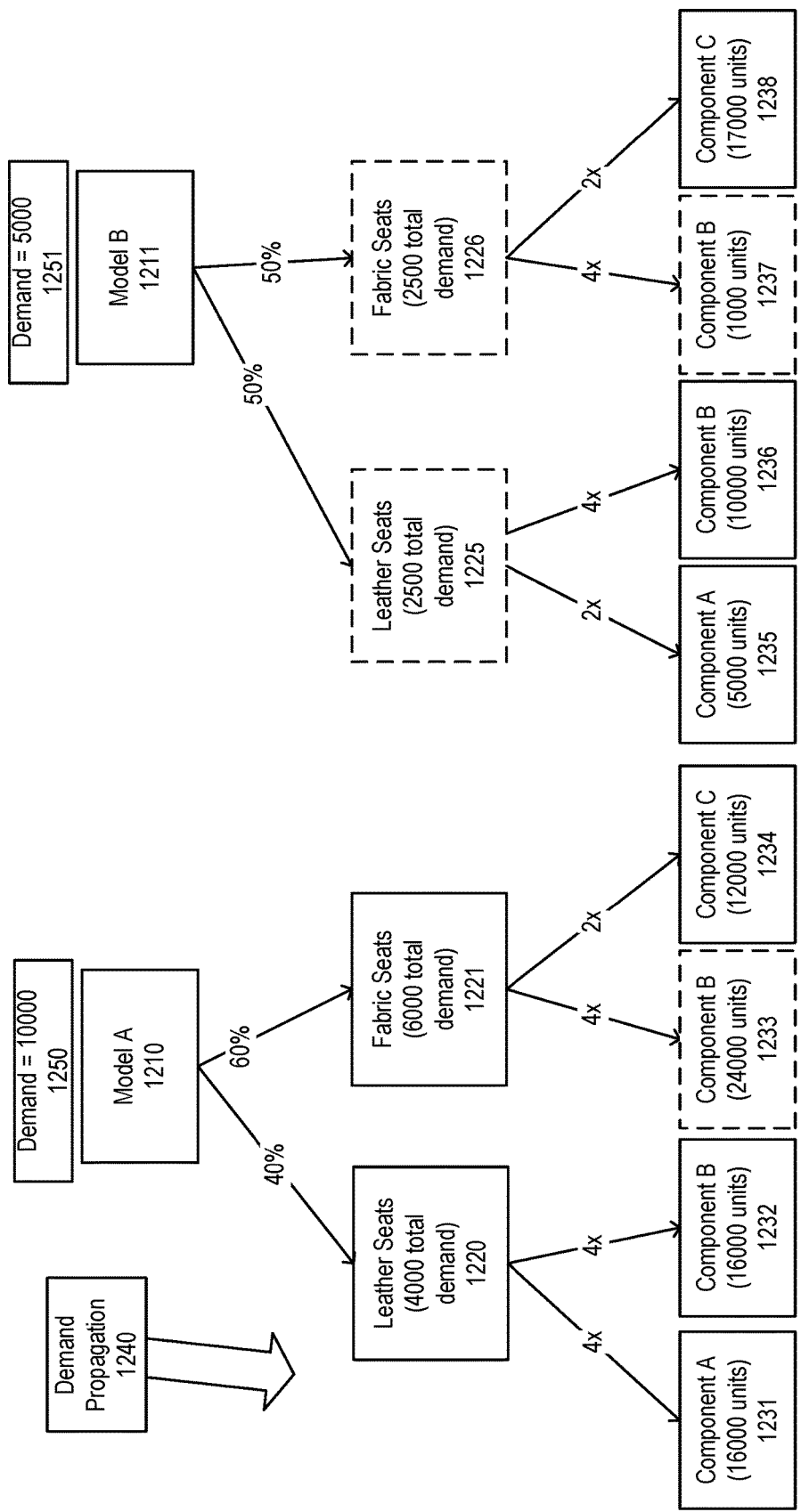
FIG. 12 shows an exemplary data structure for enabling multiple parents using shared members, in accordance with an embodiment.

FIG. 12 shows an exemplary data structure for enabling multiple parents using shared members, in accordance with an embodiment.

In accordance with an embodiment, an exemplary data structure in the form of a BOM is shown in FIG. 12. In the shown example, end products, e.g., models of cars, are shown at the top of the data structure representing the BOM. These models include model A 1210, and model B 1211, As well, as seen in the prior figure, certain dimensions of lower levels than the root level can comprise multiple parents. That is, both the leather seat option 1220 and the fabric seat option 1221 support multiple parents. Additionally, various data dimensions at a lowest level can be components 1231-1238.

In accordance with an embodiment, in order to simplify calculations and support dynamic recalculation, dimensions having multiple parents can be copied/replicated such that each dimension supports only one parent.

This is shown in FIG. 12 where component B supports multiple parents (both leather seats and fabric seats) (see FIG. 11). In such a situation, then, the data dimension representing component B can be copied/replicated such that each instance of component B only supports one parent. Downward propagation of demand in such circumstances is updated accordingly.

In accordance with an embodiment, then, component B 1232 and 1236 are replicated within each respective tree to 1233 and 1237. Downward propagation of demand 1240 is automatically updated and recalculated.

Figure 13:
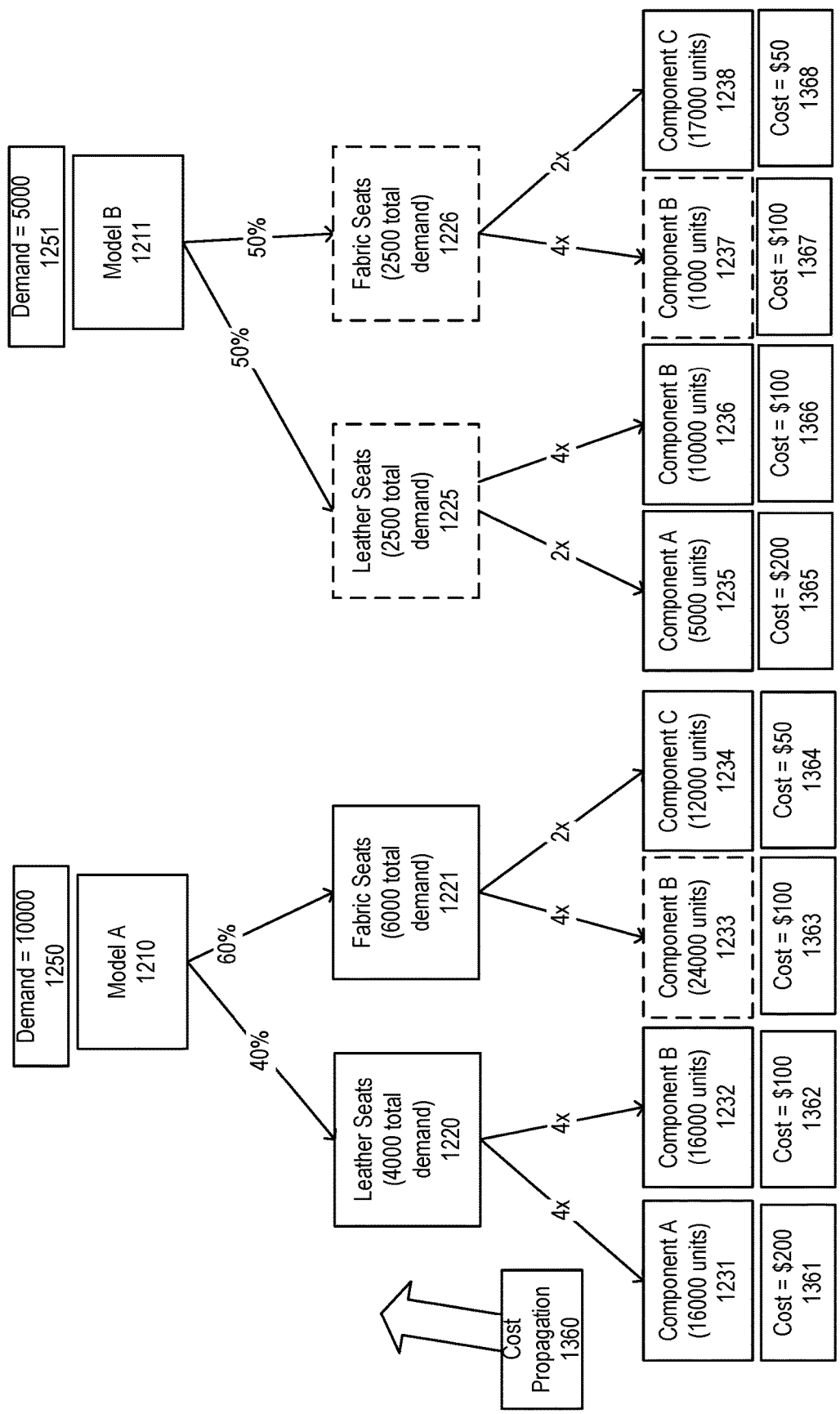
FIG. 13 shows an exemplary data structure for enabling multiple parents using shared members, in accordance with an embodiment.

FIG. 13 shows an exemplary data structure for enabling multiple parents using shared members, in accordance with an embodiment.

In accordance with an embodiment, an exemplary data structure in the form of a BOM is shown in FIG. 13. In the shown example, end products, e.g., models of cars, are shown at the top of the data structure representing the BOM. These models include model A 1210, and model B 1211. As well, as seen in the prior figure, certain dimensions of lower levels than the root level can comprise multiple parents. That is, both the leather seat option 1220 and the fabric seat option 1221 support multiple parents. Additionally, various data dimensions at a lowest level can be components 1231-1238.

In accordance with an embodiment, in order to simplify calculations and support dynamic recalculation, dimensions having multiple parents can be copied/replicated such that each dimension supports only one parent.

This is shown in FIG. 13 where both the leather seat and fabric seat data dimensions have been copied/replicated, as well as component B, which supports multiple parents (both leather seats and fabric seats). In such a situation, then, component B can be copied/replicated such that each instance of component B only supports one parent. Upward propagation of cost (1361-1368), starting at each component, is thus simplified as each "shared" member (i.e., a shared member being a child that supports multiple parent dimensions) has been copied/replicated so that it only supports a single parent.

In accordance with an embodiment, there are costs at every level. In performing a propagation of costs, the methods and systems add up all costs and add to the parent. From each parent, the systems and methods iteratively traverse all its children, gets it aggregated cost and multiply by scale factor (e.g., a bicycle needs 2 tires—multiple cost of tire by 2 as the system and methods traverses up towards the parents). The systems and methods can then add additional cost at the parent level. Supported systems and methods can use another cube "BOM_table" and use XREF to lookup the scale factor.

In accordance with an embodiment, when shared members with multiple parents are used as described above, scaling factors (e.g., cost, number of components needed . . . etc.), then the systems and methods support dynamic changing of such scaling factors over a period of time. For example, if a scaling factor between component A and leather seats assembly in FIG. 13 is changed from 4× to 2×, then a new dimension can be created for component A (e.g., component A') with a new scaling factor. In this way, at the point in time when the original scaling factor is no longer valid, the pointing from leather seats to component A can be updated to point to component A', while utilizing the new scaling factor. This process can be referred to as an engineering change order in manufacturing process, and the multiple parents using shared members allows for such change to be modeled in a data structure environment.

```
for levels leaf to root
do
    "Aggregated Children Material Cost" 0
    for each child member
        "Aggregated Children Material Cost" = "Aggregated Children
        Material Cost" +
            " Aggregated Cost: Per Unit" @ child • XREF("
BCM_table " , current member, child, " SCALEFACTOR ")
    end for (child loop)
    "Aggregated Cost Per Unit " = "Unit Cost " + "Aggregated Children
Material Cost" + " Other costs at this level which is computed as function
of other measures at this level"
endfor (level loop)
```

The following pseudocode represents a modelling expression for a supported algorithm, in accordance with an embodiment:

```
<ns6:Measures>
    <ns7:Measure scale="2" default="false" hidden="false" styleName="dollarFractionStyle"
    checkCalcConsistency="true" type="derived" name="Aggregated Children Material Cost">
        <ns7:ComplexRollUp transitiveCLE="false" operation Map:"Bom Dim-Child-To-Parent">
            <ns7: Dimension name="BomDim"/>
            <ns7:Formula><![CDATA["Aggregated Children Material Cost"= "Aggregated Children
Material Cost" +source("Aggregated Cost Per Unit")* lookup("BOM_STRUCTURE_RS",
property("BomDim", "name"), sourceSparseMember("BomDim"),
"SCALEFACTOR")]]></ns7:Formula>
            <ns7:OnChangeFormula>
                <ns7:Measure name="Aggregated Cost Per Unit"/>
                <ns7:Formula><![CDATA["Aggregated Children Material Cost"= "Aggregated Children
Material Cost"+ deltaValue(source("Aggregated Cost Per Unit"))*
lookup("BOM_STRUCTURE_RS", property("BomDim", "name"),
sourceSparseMember("BomDim"), "SCALEFACTOR")]></ns7:Formula>
            </ns7:OnChangeFormula>
        </ns7:ComplexRollUp>
    </ns7:Measure>
    <ns7:Measure scale="2" default="false" hidden="false" styleName="dollarFractionStyle"
    checkCalcConsistency="true" type="derived" name="Aggregated Cost Per Unit">
        <ns7:Formula><![CDATA["Aggregated Cost Per Unit"= "Unit Cost" + "Aggregated Children
Material Cost"]]></ns7:Formula>
        <ns7:SimpleRollUp summaryOperator="last_in_period" startLevel="Month">
            <ns7:Dimension name="FiscalCalendar"/>
        </ns7 :SimpleRoll Up>
    </ns7:Measure>
    <ns7:Measure scale="2" default="true" hidden="false" styleName="dollarFractionStyle"
    checkCalcConsistency="true" type="loaded" name="Unit Cost">
        <ns7:Formula><![CDATA["Unit Cost" = "Unit
Cost"[previous(FiscalCalendar)]]]></ns7:Formula>
        <ns7:DataRowSource columnName="UNITCOST" name="BOM_COST _RS"/>
        <ns7 :SimpleRollUp sum maryOperator="last_in_period" startLevel="Month">
            <ns7:Dimension name="FiscalCalendar"/>
        </ns7:SimpleRollUp>
    </ns7:Measure>
</ns6:Measures>
```

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions; subtractions; deletions; variations, and other modifications and changes in form, detail, implementation and application can be made therein without departing from the spirit and scope of the invention. It is intended that the broader spirit and scope of the invention be defined by the following claims and their equivalents.

What is claimed is:

1. A method for enabling multiple parents with weights in a multidimensional database, comprising:
   providing a multidimensional database server executing on a computer;
   providing a hierarchical structure of data dimensions on the multidimensional database server structured as a directed acyclic graph (DAG) comprising a plurality of nodes;
   providing, within the hierarchical structure of data dimensions, a plurality of members represented by the plurality of nodes of the DAG;
   wherein the plurality of members comprise at least a first set of members being at a first level and representing end products;

wherein the plurality of members comprise at least a second set of members being at a second level and representing options;
wherein the plurality of members comprise at least a third set of members being at a third level and representing components;
wherein one member of the first set of members at the first level comprises two or more first-member-second-member relationships with two or more members of the second set of members at the second level, wherein the two or more members at the second level represent mutually exclusive options used in a total number of end products represented by the one member of the first set of members;
wherein each member of the second set of members at the second level comprises one or more second-member-third-member relationships with one more members of the third set of members at the third level;
associating each of the one or more second-member-third-member relationships with a multiplier of a plurality of multipliers representing a number of components;
associating each of the two or more first-member-second-member relationships with a weight of a plurality of weights, wherein the weights represent fractions of the mutually exclusive options used in the total number of end products represented by the one member of the first set of members;
storing each weight in said DAG as an attribute of metadata of the two or more first-member-second-member relationships; and
storing each multiplier in said DAG as an attribute of metadata of each of the one or more second-member-third-member relationships.

2. The method of claim 1, further comprising:
associating the member of the first set of members at the first level with a demand value of a plurality of demand values.

3. The method of claim 2, further comprising:
propagating the demand value of the plurality of demand values associated with the member of the first set of members at the first level along each of the two or more first-member-second-member relationships with the member of the second set of members at the second level.

4. The method of claim 3, wherein propagating the demand value utilizes the weight associated with each of the two or more first-member-second-member relationships.

5. The method of claim 4, further comprising:
altering each of the weights of the plurality of weights associated with each of the two or more first-member-second-member relationships based upon an input received from a client tier.

6. The method of claim 5, further comprising:
updating the propagation of the demand value associated with the member of the first set of members at the first level along each of the two or more first-member-second-member relationships based upon the altered weights associated with each of the two or more first-member-second-member relationships.

7. The method of claim 6, wherein updating the propagation of the demand value is done in real time based upon the received input from the client tier.

8. A system for enabling multiple parents with weights in a multidimensional database, comprising:
a computer that includes one or more microprocessors; and
a multidimensional database server executing on the computer;
a hierarchical structure of data dimensions on the multidimensional database server structured as a directed acyclic graph (DAG) comprising a plurality of nodes;
wherein the hierarchical structure of data dimensions comprises a plurality of members represented by the plurality of nodes of the DAG;
wherein the plurality of members comprise at least a first set of members being at a first level and representing end products;
wherein the plurality of members comprise at least a second set of members being at a second level and representing options;
wherein the plurality of members comprise at least a third set of members being at a third level and representing components;
wherein one member of the first set of members at the first level comprises two or more first-member-second-member relationships with two or more members of the second set of members at the second level, wherein the two or more members at the second level represent mutually exclusive options used in a total number of end products represented by the one member of the first set of members;
wherein each member of the second set of members at the second level comprises one or more second-member-third-member relationships with one more members of the third set of members at the third level;
associating each of the one or more second-member-third-member relationships with a multiplier of a plurality of multipliers representing a number of components;
associating each of the two or more first-member-second-member relationships with a weight of a plurality of weights, wherein the weights represent fractions of the mutually exclusive options used in the total number of end products represented by the one member of the first set of members;
storing each weight in said DAG as an attribute of metadata of the two or more first-member-second-member relationships; and
storing each multiplier in said DAG as an attribute of metadata of each of the one or more second-member-third-member relationships.

9. The system of claim 8, wherein the member of the first set of members at the first level is associated with a demand value of a plurality of demand values.

10. The system of claim 9, wherein the demand value associated with the member of the first set of members at the first level is propagated along each of the two or more first-member-second-member relationships with the member of the second set of members at the second level.

11. The system of claim 10, wherein propagating the demand value utilizes the weight associated with each of the two or more first-member-second-member relationships.

12. The system of claim 11, wherein each of the weights of the plurality of weights associated with each of the two or more first-member-second-member relationships is altered based upon an input received from a client tier.

13. The system of claim 12, wherein the propagation of the demand value associated with the member of the first set of members at the first level along each of the two or more first-member-second-member relationships is updated based upon the altered weights associated with each of the two or more first-member-second-member relationships.

14. The system of claim 13, wherein updating the propagation of the demand value is done in real time based upon the received input from the client tier.

15. A non-transitory computer readable storage medium having instructions thereon for enabling multiple parents with weights in a multidimensional database, which when read and executed cause a computer to perform steps comprising:
  providing a multidimensional database server executing on a computer;
  providing a hierarchical structure of data dimensions on the multidimensional database server structured as a directed acyclic graph (DAG) comprising a plurality of nodes;
  providing, within the hierarchical structure of data dimensions, a plurality of members represented by the plurality of nodes of the DAG;
  wherein the plurality of members comprise at least a first set of members being at a first level and representing end products;
  wherein the plurality of members comprise at least a second set of members being at a second level and representing options;
  wherein the plurality of members comprise at least a third set of members being at a third level and representing components;
  wherein one member of the first set of members at the first level comprises two or more first-member-second-member relationships with two or more members of the second set of members at the second level, wherein the two or more members at the second level represent mutually exclusive options used in a total number of end products represented by the one member of the first set of members;
  wherein each member of the second set of members at the second level comprises one or more second-member-third-member relationships with one more members of the third set of members at the third level;
  associating each of the one or more second-member-third-member relationships with a multiplier of a plurality of multipliers representing a number of components;
  associating each of the two or more first-member-second-member relationships with a weight of a plurality of weights, wherein the weights represent fractions of the mutually exclusive options used in the total number of end products represented by the one member of the first set of members;
  storing each weight in said DAG as an attribute of metadata of the two or more first-member-second-member relationships; and
  storing each multiplier in said DAG as an attribute of metadata of each of the one or more second-member-third-member relationships.

16. The non-transitory computer readable storage medium of claim 15, the steps further comprising:
  associating the member of the first set of members at the first level with a demand value of a plurality of demand values.

17. The non-transitory computer readable storage medium of claim 16, the steps further comprising:
  propagating the demand value of the plurality of demand values associated with the member of the first set of members at the first level along each of the two or more first-member-second-member relationships with the member of the second set of members at the second level.

18. The non-transitory computer readable storage medium of claim 17, wherein propagating the demand value utilizes the weight associated with each of the two or more first-member-second-member relationships.

19. The non-transitory computer readable storage medium of claim 18, the steps further comprising:
  altering each of the weights of the plurality of weights associated with each of the two or more first-member-second-member relationships based upon an input received from a client tier.

20. The non-transitory computer readable storage medium of claim 19, the steps further comprising:
  updating the propagation of the demand value associated with the member of the first set of members at the first level along each of the two or more first-member-second-member relationships based upon the altered weights associated with each of the two or more first-member-second-member relationships; and
  wherein updating the propagation of the demand value is done in real time based upon the received input from the client tier.

* * * * *

UNITED STATES PATENT AND TRADEMARK OFFICE
CERTIFICATE OF CORRECTION

| | | |
|---|---|---|
| PATENT NO. | : 11,593,402 B2 | Page 1 of 2 |
| APPLICATION NO. | : 16/023810 | |
| DATED | : February 28, 2023 | |
| INVENTOR(S) | : Kumar Ramaiyer | |

It is certified that error appears in the above-identified patent and that said Letters Patent is hereby corrected as shown below:

On the Title Page

On page 2, Column 2, under Other Publications, Line 26, delete "Dracle," and insert -- Oracle, --, therefor.

On page 2, Column 2, under Other Publications, Line 43, delete "retreived" and insert -- retrieved --, therefor.

In the Drawings

On sheet 9 of 13, in Figure 9, under Reference Numeral 930, Line 2, delete "weights" and insert -- weights. --, therefor.

In the Specification

In Column 3, Line 3, delete "Studio" and insert -- Studio/ --, therefor.

In Column 4, Line 2, delete "(e.g.;" and insert -- (e.g., --, therefor.

In Column 4, Line 2, delete "Market;" and insert -- Market, --, therefor.

In Column 4, Line 10, delete "(parents;" and insert -- (parents, --, therefor.

In Column 6, Line 31, delete "selected)," and insert -- selected). --, therefor.

In Column 6, Line 45, delete "embodiment;" and insert -- embodiment, --, therefor.

In Column 6, Line 51, delete "example;" and insert -- example, --, therefor.

In Column 6, Line 64, delete "examples;" and insert -- examples, --, therefor.

Signed and Sealed this
Second Day of January, 2024

Katherine Kelly Vidal
*Director of the United States Patent and Trademark Office*

In Column 6, Line 67, delete "assemblies," and insert -- assemblies. --, therefor.

In Column 8, Line 64, delete "seats," and insert -- seats. --, therefor.

In Column 10, Line 65, delete "etc," and insert -- etc., --, therefor.

In Column 11, Line 33, delete "612," and insert -- 612. --, therefor.

In Column 11, Line 37, delete "B," and insert -- B. --, therefor.

In Column 16, Line 14, delete "1211," and insert -- 1211. --, therefor.

In Column 18, Line 17, delete "endfor" and insert -- end for --, therefor.

In Column 20, Line 46, delete "additions; subtractions; deletions;" and insert -- additions, subtractions, deletions, --, therefor.